US012497807B2

(12) United States Patent
Matsumura

(10) Patent No.: US 12,497,807 B2
(45) Date of Patent: Dec. 16, 2025

(54) MOBILE BODY MOVING DEVICE

(71) Applicant: HI-LEX CORPORATION, Hyogo (JP)

(72) Inventor: Kenji Matsumura, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 1069 days.

(21) Appl. No.: 17/312,977

(22) PCT Filed: Dec. 12, 2019

(86) PCT No.: PCT/JP2019/048749

§ 371 (c)(1),
(2) Date: Jun. 11, 2021

(87) PCT Pub. No.: WO2020/122190

PCT Pub. Date: Jun. 18, 2020

(65) Prior Publication Data

US 2022/0049526 A1 Feb. 17, 2022

(30) Foreign Application Priority Data

Dec. 12, 2018 (JP) ................................ 2018-232326

(51) Int. Cl.
*E05B 81/58* (2014.01)
*E05B 81/04* (2014.01)
(Continued)

(52) U.S. Cl.
CPC .............. *E05B 81/58* (2013.01); *E05B 81/04* (2013.01); *E05B 81/66* (2013.01); *E05B 83/18* (2013.01)

(58) Field of Classification Search
None
See application file for complete search history.

(56) References Cited

U.S. PATENT DOCUMENTS

2020/0392767 A1* 12/2020 Kothe .................... E05B 81/06

FOREIGN PATENT DOCUMENTS

JP 08002381 Y 1/1996
JP 2016050411 A * 4/2016

OTHER PUBLICATIONS

Computer Generated Translation for JP 2016050411 A, Generated on Aug. 14, 2024, https://worldwide.espacenet.com/ (Year: 2024).*

(Continued)

*Primary Examiner* — Alyson M Merlino
(74) *Attorney, Agent, or Firm* — Shih IP Law Group, PLLC.

(57) ABSTRACT

A mobile body moving device includes: a mobile body; an engaged portion; a lock mechanism including an engaging portion, a driving section, and a position detection section; a control section calculating a reference electrical quantity by multiplying time taken for movement of the engaging portion from a movement start position to a predetermined position by an initial voltage for the movement; and a voltage detection section. When determining that the position detection section is abnormal, the control section calculates a necessary driving time from the reference electrical quantity and a movement initial voltage for the movement from the movement start position during the movement, and drives the driving section only for the necessary driving time. Thereby, it is possible to perform control such that the engaging portion of the lock mechanism driven by the driving section is positioned in the predetermined position even when a voltage changes.

3 Claims, 6 Drawing Sheets

(51) Int. Cl.
*E05B 81/66* (2014.01)
*E05B 83/18* (2014.01)

(56) References Cited

OTHER PUBLICATIONS

1 International Search Report from International Application No. PCT/JP2019/048749, mailed Feb. 25, 2020.

* cited by examiner

MOBILE BODY MOVING DEVICE

TECHNICAL FIELD

The present invention relates to a mobile body moving device.

BACKGROUND ART

A mobile body in which an opening of a base is set to an open state or a closed state is locked by engagement between a portion to be engaged (hereinafter, referred to as "engaged portion") of the mobile body and an engaging portion of a lock mechanism such as a latch at a closed position. At this time, a driving section is driven based on information from a position detection section, and the engaging portion moves to a predetermined position where the engaging portion is engageable with the engaged portion.

However, in a case where the engaging portion cannot move to the predetermined position where the engaging portion is engageable with the engaged portion due to a failure of the position detection section, it is conceivable that the engaged portion of the mobile body cannot be engaged with the engaging portion of the lock mechanism, that the mobile body cannot be brought into a locked state, and further that a fault occurs to a motor and/or the like due to an excessive movement.

To address such a problem, Patent Literature (hereinafter, referred to as PTL) 1, for example, proposes an automatic door closing device in which, even when a return confirmation switch fails at a time of return-turning by a motor of a closure that is a lock mechanism, a door is once closed to a fully-closed position and a latch is then returned to a predetermined position by reverse rotation of the motor for a certain time.

CITATION LIST

Patent Literature

PTL 1
Japanese Examined Utility Model (Registration) Application Publication No. H08-002381

SUMMARY OF INVENTION

Technical Problem

In the case of using such a device in which a latch is moved to a predetermined position by rotation of a motor for a certain time, however, the position of the moved latch differs from the predetermined position in some cases when a voltage changes due to a temperature and/or an operation environment.

An object of the present invention is to provide a mobile body moving device capable of performing control such that an engaging portion of a lock mechanism driven by a driving section is positioned in a predetermined position even in a case where a voltage changes.

Solution to Problem

A mobile body moving device of the present invention includes:

a mobile body that moves between an open position and a closed position with respect to a base;

an engaged portion provided in one of the base and the mobile body;

a lock mechanism including an engaging portion that is provided in another of the base and the mobile body and engages with the engaged portion, a driving section that performs an engagement operation and a release operation between the engaging portion and the engaged portion, and a position detection section that detects a position of the engaging portion;

a control section that controls the engagement operation and the release operation by the driving section; and a voltage detection section that measures a voltage of the driving section, wherein the control section calculates a reference electrical quantity by multiplying time taken for movement of the engaging portion from a movement start position to a predetermined position by an initial voltage for the movement, and when the control section determines that the position detection section is abnormal during the movement from the movement start position to the predetermined position, the control section calculates a necessary driving time from the reference electrical quantity and a movement initial voltage for the movement from the movement start position during the movement, and drives the driving section only for the necessary driving time.

Advantageous Effects of Invention

According to the present invention, it is possible to perform control such that an engaging portion of a lock mechanism driven by a driving section is positioned in a predetermined position even in a case where a voltage changes.

DESCRIPTION OF EMBODIMENT

Hereinafter, the present embodiment will be described in detail with reference to the accompanying drawings. Note that, in the present embodiment, an automobile that performs movement control of a back door is illustrated as an example of mobile body moving device 1, but mobile body moving device 1 is also applicable to a device that controls movement of a shutter, a sliding door or a hinged door installed at a structure such as a store and a garage, or foldable eaves disposed above an opening of a front of the structure.

[Overall Configuration of Mobile Body Moving Device]

Figure 1:
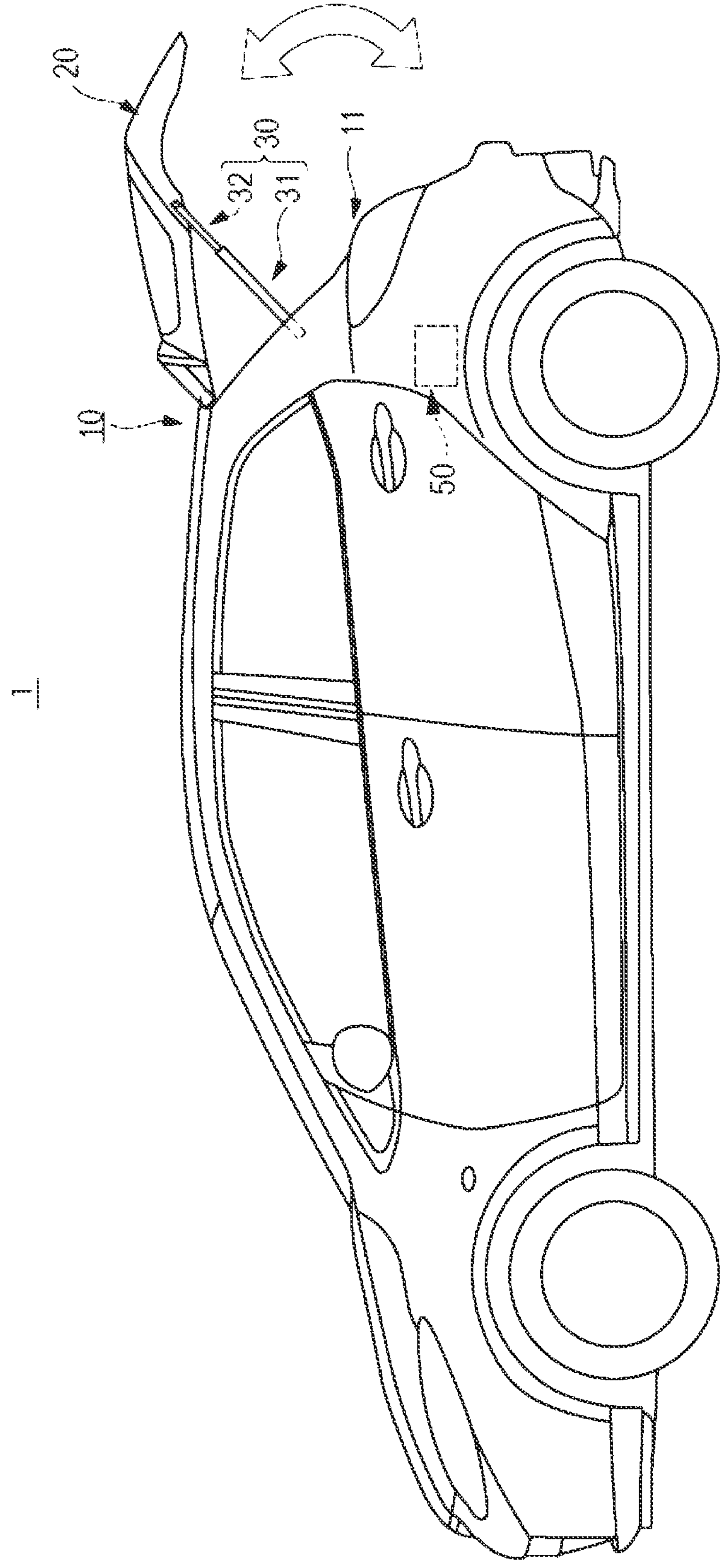
FIG. 1 is a schematic side view of an automobile including a mobile body moving device of an embodiment of the present invention.

FIG. 1 is a schematic side view of an automobile including mobile body moving device 1 of the present embodiment.

Figure 4:
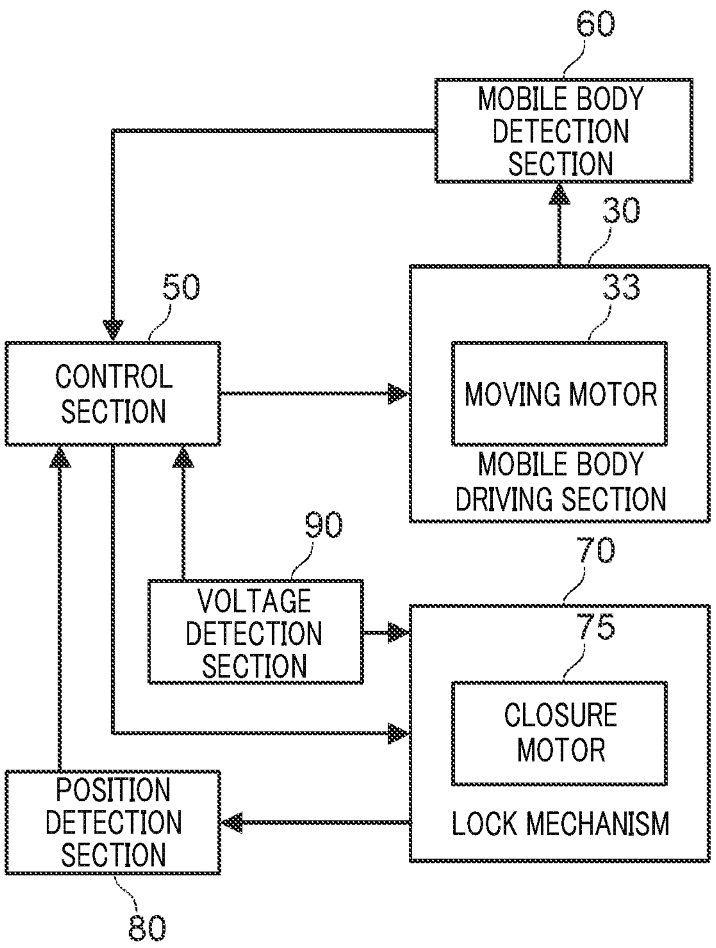
FIG. 4 is a block diagram provided for describing a control system of the mobile body moving device.

As illustrated in FIG. 1, mobile body moving device 1 includes opening member 10 as an example of a base, mobile body 20, mobile body driving section 30, control section 50, mobile body detection section 60 (see FIG. 4), lock mechanism 70 (see FIG. 2), position detection section 80 (see FIG. 4), and voltage detection section 90 (see FIG. 4).

Mobile body moving device 1 is a device that moves mobile body 20 with respect to opening 11 of opening member 10.

[Opening Member]

In the automobile using mobile body moving device 1 of the present embodiment, opening member 10 is provided in a rear portion with respect to a traveling direction of a vehicle body. Opening member 10 is the vehicle body used in the automobile and opening 11 is formed by an edge potion of opening member 10. The shape of opening 11 may be any shape including a rectangular shape, a circular shape and/or the like.

[Mobile Body]

Figure 2:
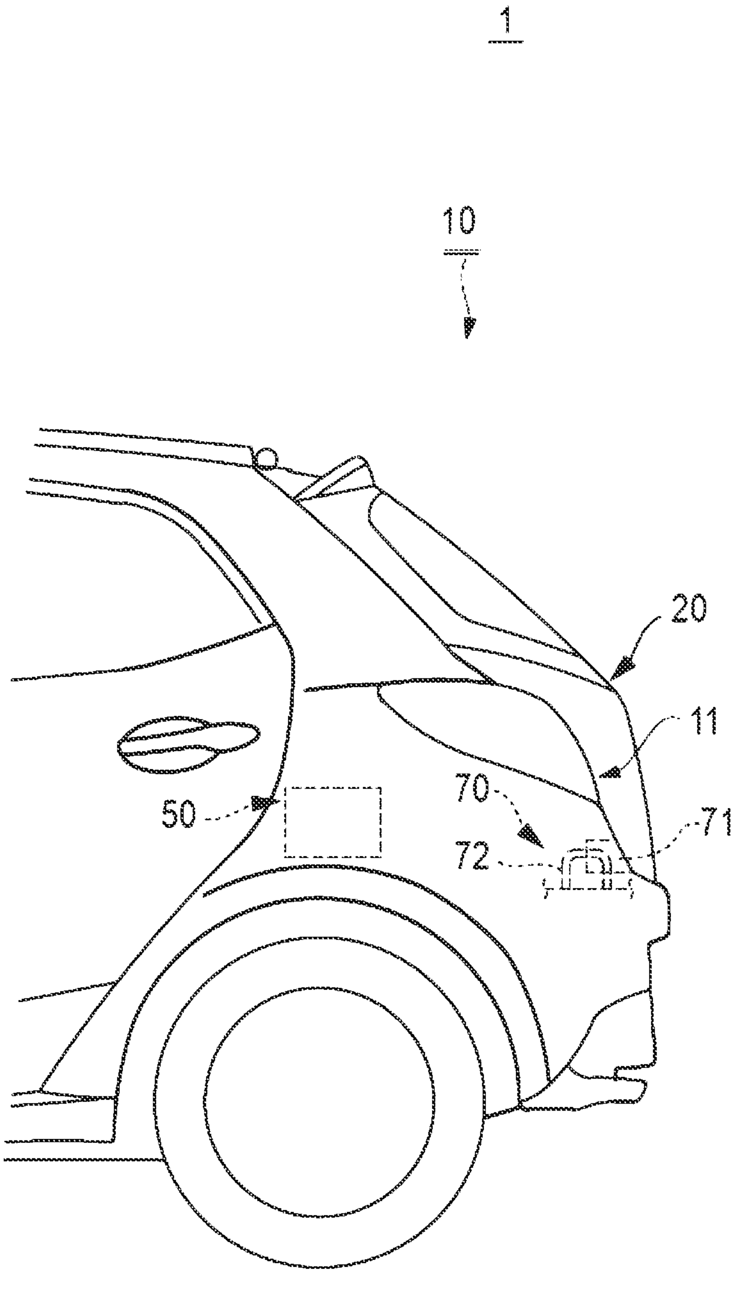
FIG. 2 is a partially enlarged side view of a rear portion of the automobile including the mobile body moving device of the present embodiment.

Mobile body 20 is a back door of the automobile, and transitions to an open state (see FIG. 1) or a closed state (see FIG. 2). The open state in mobile body 20 is a state in which opening 11 is opened. In the rear portion of the vehicle, the open state in mobile body 20 is a state in which loading and unloading of an object, such as luggage, into or from a rear trunk via opening 11 from an outside is allowed. The closed state in mobile body 20 is a state in which opening 11 is covered. In other words, the closed state can be described as a state when mobile body 20 is in a position to block an object, such as luggage, from passing through opening 11 and moving to an opposite side. Further, the open state can be described as a state when mobile body 20 is in a position to allow the object to pass through opening 11 and move to the opposite side.

In the present embodiment, an upper side portion of mobile body 20 is turnably attached to a side of an upper edge portion of opening 11 in opening member 10 via a shaft portion serving as a hinge. Mobile body 20 pivots such that a side of a lower side portion thereof moves up and down about the shaft portion, and comes into contact with or is separated from opening 11, thereby transitioning mobile body 20 to the open state or the closed state. In the present embodiment, the positional change of mobile body 20 is realized by the pivoting mechanism described above, but the mechanism for the positional change of mobile body 20 is not limited to pivoting and may be any mechanism as long as it is possible to transition mobile body 20 to the open state or the closed state.

Note that, mobile body 20 may be any mobile body as long as the mobile body can transition to the open state or the closed state, and may be a slide door, for example.

[Mobile Body Driving Section]

Mobile body driving section 30 moves mobile body 20 in an opening direction and a closing direction with respect to opening 11 of opening member 10. More than one mobile body driving section 30 may be provided. In the present embodiment, mobile body driving section 30 is provided one each in total of two to both left and right edges of mobile body 20 and both left and right ends of opening 11. By moving mobile body 20 by driving respective mobile body driving sections 30, mobile body 20 is relatively moved with respect to opening member 10 and transitions to the open state or the closed state.

As long as two mobile body driving sections 30 are capable of moving mobile body 20 in a direction in which mobile body 20 is set to the open state (opening direction) and in a direction in which mobile body 20 is set to the closed state (closing direction), respective mobile body driving sections 30 may drive mobile body 20 in the same direction with the same driving quantity. Further, as long as two respective mobile body driving sections 30 are capable of moving mobile body 20 in the opening direction and in the closing direction, two mobile body driving sections 30 may drive mobile body 20 in different directions with different driving quantities. In the present embodiment, each mobile body driving section 30 is provided so as to perform the same driving in synchronization with each other.

Mobile body driving sections 30 are provided between opening member 10 and mobile body 20 such that mobile body 20 is relatively movable with respect to opening member 10. In order for mobile body 20 to pivotally move with respect to opening member 10, each mobile body driving section 30 is pivotably attached to opening member 10 so as to be capable of being driven while pivoting by following the pivoting of mobile body 20.

Specifically, each mobile body driving section 30 has a telescopic bar shape appearance and includes a driving main-body portion, which is disposed on a side of one end portion of mobile body driving section 30 and is connected to a side of opening member 10, and a forward-backward moving section, which is disposed on a side of another end portion of mobile body driving section 30 and is connected to a side of mobile body 20. The forward-backward moving section is attached so as to be capable of protruding and receding from a side of another end portion of the driving main-body portion.

Mobile body driving section 30 can move, by moving the forward-backward moving section forward and backward in a longitudinal direction of mobile body driving section 30 with respect to the driving main-body portion, mobile body 20 to a fully-closed position, that is, the position where opening 11 is completely covered, and to a fully-open position, that is, the position where opening 11 is opened to a maximum extent. Each mobile body driving section 30 moves mobile body 20 in the opening direction or the closing direction by converting a rotary motion of a motor or the like into an extension and retraction motion in a linear direction.

Mobile body driving sections 30 are provided one each to both the left and right ends of the rear portion of the automobile in total of two, but the number of mobile body driving sections 30 to be used is not particularly limited. Further, as long as mobile body driving section 30 enables mobile body 20 to move, the structure, shape and/or installation position of mobile body driving section 30 are not particularly limited. As mobile body driving section 30, a publicly known driving section capable of driving mobile body 20, can be employed.

In the present embodiment, mobile body driving section 30 includes main-body cylinder portion 31, sliding cylinder portion 32, moving motor 33 (see FIG. 4), a spindle (illustration is omitted), a spindle nut (illustration is omitted), an energizing member (illustration is omitted) and/or the like. In mobile body driving section 30, main-body cylinder portion 31, moving motor 33, the spindle, the energizing member and/or the like correspond to the driving main-body portion, and sliding cylinder portion 32 and the spindle nut correspond to the forward-backward moving section.

Main-body cylinder portion 31 is pivotably fixed to opening member 10 on a side of one end portion of main-body cylinder portion 31 and is opened on a side of another end portion thereof. Sliding cylinder portion 32 is disposed inside of main-body cylinder portion 31 such that sliding cylinder portion 32 is slidingly movable in the longitudinal direction so as to protrude or recede from the side of the other end portion of main-body cylinder portion 31.

Moving motor 33 drives to move the forward-backward moving section in the longitudinal direction with respect to the driving main-body portion to extend and retract mobile body driving section 30. Moving motor 33 is a DC motor or an AC motor. In a case where mobile body moving device 1 is applied to an automobile, a DC motor is preferably adopted as moving motor 33 in considering that a DC power supply of the automobile is used. Note that, moving motor 33 is connected to control section 50, and rotational driving of both forward rotation and reverse rotation is controlled by control section 50.

Sliding cylinder portion 32 is energized by the energizing member from a side of one end to a side of another end of main-body cylinder portion 31. Inside of sliding cylinder portion 32, the spindle nut is provided. The spindle nut is screwed with the spindle which rotates axially by rotation of moving motor 33.

Mobile body driving section 30 is configured such that both main-body cylinder portion 31 and sliding cylinder portion 32 do not corotate due to the rotation of the spindle. When moving motor 33 rotates in a forward or reverse direction, the spindle rotates in an axially forward or reverse direction, and the spindle nut screwed with the spindle moves along the longitudinal direction of the spindle. Along with this movement, sliding cylinder portion 32 including the spindle nut moves forward and backward, that is, slidingly moves in the longitudinal direction. Thus, mobile body driving section 30 moves so as to extend and retract, and mobile body 20 is operated in correspondence to a length of advance of sliding cylinder portion 32 from main-body cylinder portion 31.

[Lock Mechanism]

Figure 3A:
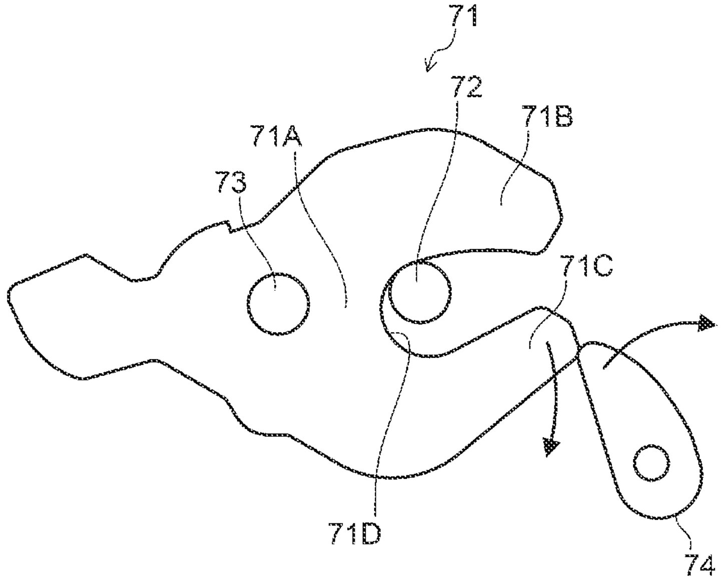
FIG. 3A is a diagram illustrating a fully-latched state in a lock mechanism.
Figure 3B:
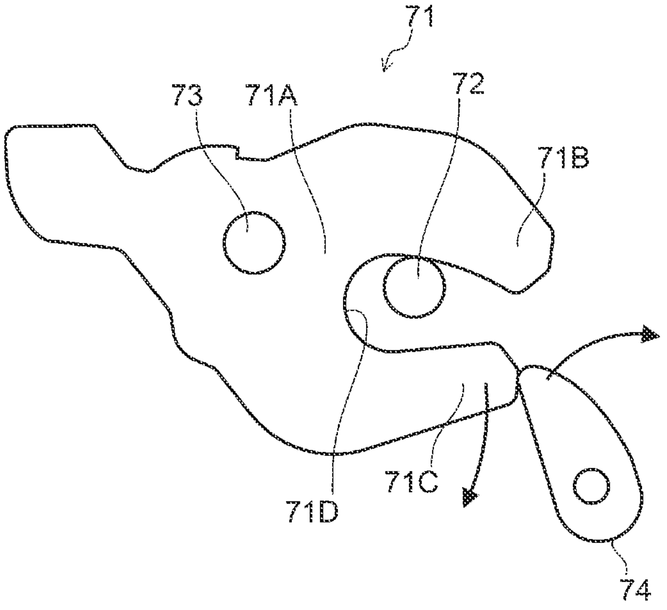
FIG. 3B is a diagram illustrating how transition from the fully-latched state to a half-latched state is made in the lock mechanism.
Figure 3C:
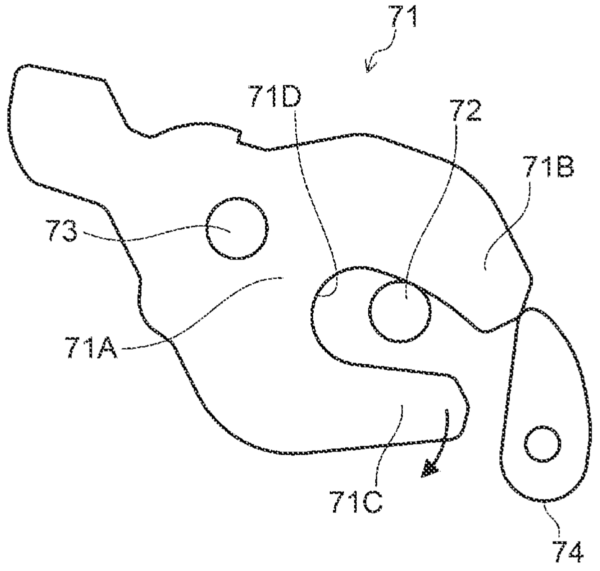
FIG. 3C is a diagram illustrating the half-latched state in the lock mechanism.
Figure 3D:
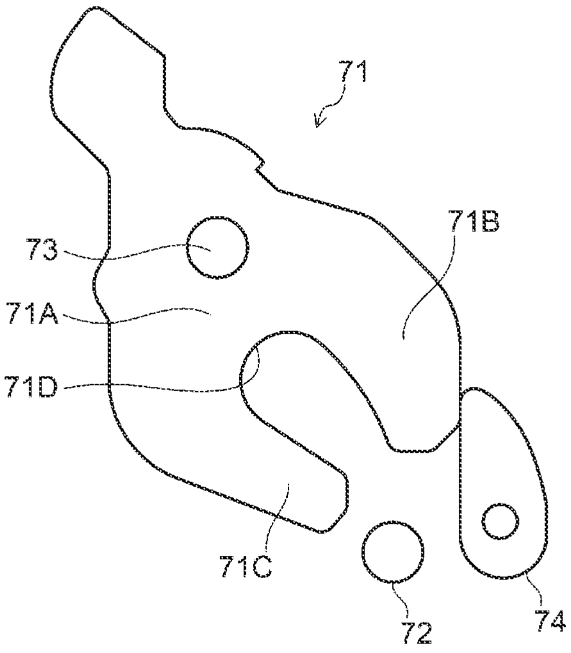
FIG. 3D is a diagram illustrating an unlatched state in the lock mechanism.

FIG. 2 is a partially enlarged side view of the rear portion of the automobile including the mobile body moving device of the present embodiment. FIG. 3A is a diagram illustrating a fully-latched state in a lock mechanism. FIG. 3B is a diagram illustrating how transition from the fully-latched state to a half-latched state is made in the lock mechanism. FIG. 3C is a diagram illustrating the half-latched state in the lock mechanism. FIG. 3D is a diagram illustrating an unlatched state in the lock mechanism.

As illustrated in FIG. 2 and FIG. 3A, lock mechanism 70 is a mechanism provided for locking mobile body 20 in the closed state with respect to opening 11. Lock mechanism 70 includes latch 71, striker 72, turning shaft 73, pole 74, and closure motor 75 (see FIG. 4).

Latch 71 is a member engageable with striker 72 and provided in an inner-side lower end portion of mobile body 20. Latch 71 includes base portion 71A, first arm 71B which extends from an upper end portion of base portion 71A, and second arm 71C which extends from a lower end portion of base portion 71A. First arm 71B and second arm 71C each extend in the same direction (in the direction from left to right in FIG. 3A) from base portion 71A. Latch 71 corresponds to the "engaging portion" of the present invention.

Striker 72 is a member engageable with latch 71 and includes a rod-shape portion capable of entering recess portion 71D formed by base portion 71A, first arm 71B, and second arm 71C of latch 71. For example, a portion parallel in the left and right direction in FIG. 2 is the rod-shape portion of striker 72. Striker 72 corresponds to the "engaged portion" of the present invention.

In mobile body 20, striker 72 is provided in a position such that the rod-shape portion is engaged with latch 71 in the fully-latched state when mobile body 20 is set in the closed state in a lower edge portion of opening 11 in opening member 10. Note that, in a case where latch 71 is provided on a side of opening member 10, striker 72 is provided on a side of mobile body 20.

Latch 71 is configured to be turnable about turning shaft 73. Latch 71 transitions among the fully-latched state (the state in FIG. 3A), the half-latched state (the state in FIG. 3C), and the unlatched state (the state in FIG. 3D) by turning by a driving force of closure motor 75, for example.

The fully-latched state is a state in which striker 72 is locked by latch 71. More specifically, the fully-latched state is a fully-engaged state in which engagement is made such that striker 72 cannot be separated from recess portion 71D of latch 71.

The half-latched state is a state in which the engagement force between latch 71 and striker 72 is smaller than the engagement force in the fully-latched state. More specifically, the half-latched state is a state in which striker 72 can be readily separated from recess portion 71D of latch 71 by application of an external force, and in which striker 72 is movable to a position to engage with latch 71 (a position of the fully-latched state).

The unlatched state is a state in which engagement between latch 71 and striker 72 is completely released. In other words, latch 71 in a position of the unlatched state is in a state capable of receiving striker 72 in recess portion 71D.

Further, latch 71 may be energized by the energizing member (not illustrated) so as to turn in a clockwise direction in FIG. 3A to FIG. 3D. Thus, by controlling turning of pole 74 to be described later, latch 71 can be caused to turn from the fully-latched state to the unlatched state by the energizing force of the energizing member.

Pole 74 is a member capable of regulating turning of latch 71 and is provided in a position where pole 74 is capable of coming into contact with either of first arm 71B and second arm 71C of latch 71. Pole 74 is provided turnably and is controlled under driving of closure motor 75 so as to be positioned in a first position (see FIG. 3A), a second position (see FIG. 3C), and a third position (see FIG. 3D) from an upstream side in the clockwise direction.

Closure motor 75 is a DC motor or an AC motor, and changes the state of latch 71 in lock mechanism 70 by turning of latch 71 and pole 74. Note that, closure motor 75 is connected to control section 50, and rotational driving of both forward rotation and reverse rotation is controlled by control section 50. Closure motor 75 corresponds to the "driving section" of the present invention.

An example of an operation in lock mechanism 70 will be described, herein. First, an operation when lock mechanism 70 transitions from the fully-latched state to the unlatched state will be described.

As illustrated in FIG. 3A, when pole 74 is in the first position, a leading end of second arm 71C in latch 71 in the fully-latched state comes into contact with pole 74. Thus, the turning of latch 71 is regulated, and thus, the fully-latched state of latch 71 is maintained.

As illustrated in FIG. 3B, when pole 74 turns in the clockwise direction from the first position, the contact state with second arm 71C is released. Latch 71 turns in the clockwise direction by the driving force of closure motor 75.

As illustrated in FIG. 3C, when pole 74 further turns and is positioned in the second position, pole 74 and first arm 71B of latch 71 come into contact with each other. At this time, latch 71 is in a position of the half-latched state, and the position of latch 71 is maintained in the position of the half-latched state by regulation of the turning of latch 71 by pole 74.

As illustrated in FIG. 3D, when pole 74 further turns and is positioned in the third position, the contact state between pole 74 and first arm 71B of latch 71 is released. Thus, latch 71 turns in the clockwise direction by the driving force of closure motor 75 and is positioned in the position of the unlatched state. That is, the engagement between latch 71 and striker 72 is completely released.

Moreover, the engagement force between latch 71 and striker 72 in the half-latched state is small as compared with the engagement force in the fully-latched state even without turning of pole 74 from the second position. For this reason, it is possible to release the engagement between latch 71 and striker 72 by a force to move mobile body 20 in the opening direction by the driving force of moving motor 33.

Next, an operation when lock mechanism 70 transitions from the unlatched state to the fully-latched state will be described. First, in a state in which latch 71 is positioned in the position of the unlatched state as illustrated in FIG. 3C and FIG. 3D, striker 72 enters recess portion 71D of latch 71 by movement of mobile body 20 by mobile body driving section 30. Latch 71 then turns in a counterclockwise direction by the driving force of closure motor 75. Thus, lock mechanism 70 is set to the half-latched state. Further, latch 71 may be forced to move from the position of the unlatched state to the position of the half-latched state by the movement of mobile body 20 by mobile body driving section 30.

Then, as illustrated in FIG. 3A and FIG. 3B, latch 71 turns in the counterclockwise direction by the driving force of closure motor 75 so as to pull striker 72 into recess portion 71D of latch 71, and thus, lock mechanism 70 is set to the fully-latched state.

Note that, as long as lock mechanism 70 has a configuration capable of being driven by closure motor 75, lock mechanism 70 may adopt any configuration.

[Configuration of Control System]

FIG. 4 is a block diagram illustrating a control system of mobile body moving device 1.

In mobile body moving device 1, the control system includes control section 50, mobile body detection section 60, position detection section 80, and voltage detection section 90. The control system of mobile body moving device 1 controls mobile body 20 driven by mobile body driving section 30 including moving motor 33.

[Mobile Body Detection Section]

Mobile body detection section 60 detects movement of the position of mobile body 20 by detecting, for example, an operation of mobile body driving section 30, and outputs movement information on mobile body 20, which is a result of the detection, to control section 50.

Mobile body detection section 60 includes, for example, Hall elements, and detects the operation of mobile body driving section 30 and further the movement of the position of mobile body 20 by magnetically detecting a rotation state of moving motor 33. In this case, magnets are positioned circumferentially with different intervals on a disk provided on the rotation shaft of moving motor 33, and the Hall elements of mobile body detection section 60 are disposed in positions facing the magnets. Pulses are generated by capturing magnets moving along with the rotation of the rotation shaft of moving motor 33 by the Hall elements. Control section 50 calculates the position of mobile body 20 by a count value resulting from counting of the pulses and calculates a driving speed of mobile body 20 by a change in the count value.

Mobile body detection section 60 counts the captured pulses, and control section 50 uses the count value as the movement information on mobile body 20 and makes the count value of the pulses usable for calculating the position and the driving speed of mobile body 20 in control section 50. Note that, it is also possible to adopt a configuration in which mobile body detection section 60 not only counts pulses but also calculates the position and the driving speed of mobile body 20 based on the count value and outputs the result of the calculation to control section 50.

Further, as long as mobile body detection section 60 is capable of detecting information on the movement of the position of mobile body 20, mobile body detection section 60 may adopt any configuration, and for example, mobile body detection section 60 may be configured to directly detect the movement of the position of mobile body 20 without detecting the operation of mobile body driving section 30. The detection method is not limited to the detection performed magnetically using Hall elements, and any method may be adopted as long as a count value in accordance with the position of mobile body 20 can be generated. Further, although mobile body detection section 60 has been described as a mobile body detection section that is provided separately from control section 50 to be described later, mobile body detection section 60 may be a mobile body detection section incorporated into control section 50.

Note that, control section 50 may be configured to acquire a count value set in advance from a storage section and/or the like, for example, in accordance with the result of output from mobile body detection section 60 in a case where mobile body detection section 60 outputs an output value other than a count value to control section 50.

[Position Detection Section]

Position detection section 80 detects the position of latch 71. Specifically, position detection section 80 is provided in, for example, lock mechanism 70, detects the unlatched state of lock mechanism 70, and outputs a result of the detection to control section 50. Position detection section 80 detects, for example, based on the turning state of latch 71 whether or not latch 71 is engaged with striker 72.

Position detection section 80 includes a detection switch that transitions to an OFF state when latch 71 is in a position of a state in which latch 71 is not engaged with striker 72, that is, in the state in FIG. 3D, and transitions to an ON state when latch 71 is in positions of states in which latch 71 is engaged with striker 72, that is, in the states in FIG. 3A to FIG. 3C. Specifically, lock mechanism 70 is provided with a link mechanism (not illustrated), and the detection switch switches between the ON state and the OFF state in accordance with the turning state of latch 71 via the link mechanism. Thus, control section 50 to be described later determines whether or not latch 71 is engaged with striker 72, based on a signal of the ON state and a signal of the OFF state which are outputted from position detection section 80.

Further, position detection section 80 may include a switch capable of detecting the unlatched state and/or the fully-latched state.

Moreover, as long as position detection section 80 is capable of detecting the latch state of lock mechanism 70, position detection section 80 may be any position detection section.

Further, position detection section 80 may not be provided in mobile body moving device 1. In this case, mobile body moving device 1 may be configured to acquire a detection signal of the latch state from an outside.

[Voltage Detection Section]

Voltage detection section 90 measures a voltage value applied to closure motor 75. Specifically, voltage detection section 90 is, for example, a voltage detection circuit provided within control section 50, and measures a voltage value applied to closure motor 75 from a terminal of closure motor 75 and/or the like. Note that, as long as voltage detection section 90 is capable of measuring a voltage value applied to closure motor 75, voltage detection section 90 may be any voltage detection section.

[Control Section]

Control section 50 includes a central processing unit (CPU), a read only memory (ROM), a random access memory (RAM) and/or the like. The CPU reads a program from the ROM in accordance with a processing content, loads the program into the RAM, and performs centralized control for operation of each block of mobile body moving device 1 in cooperation with the loaded program. At this time, various types of data stored in a storage section (illustration is omitted) are referred to. The storage section (illustration is omitted) is, for example, formed of a non-volatile semiconductor memory (so-called flash memory) and/or a hard disk drive. Control section 50 may be, for example, incorporated into an electronic control unit (ECU) which controls each part of a vehicle, or may be mounted on mobile body driving section 30.

Control section 50 controls mobile body driving section 30 such that mobile body 20 moves between the open state and the closed state. Further, control section 50 controls an engagement operation and a release operation between latch 71 and striker 72 by closure motor 75. Control section 50 is not required to be integral, and a plurality of control elements constituting control section 50 may respectively control mobile body driving section 30 and the lock mechanism.

First, control of the release operation between latch 71 and striker 72 and movement control of mobile body 20 will be described.

In a case where control section 50 transitions mobile body 20 from the closed state to the open state, control section 50 controls the release operation between latch 71 and striker 72. Specifically, control section 50 controls lock mechanism 70 such that the engagement between latch 71 and striker 72 is released. Control section 50 controls closure motor 75 such that latch 71 is moved from the position of the fully-latched state illustrated in FIG. 3A to the position of the unlatched state illustrated in FIG. 3D. Control section 50 controls moving motor 33 such that mobile body 20 is moved to the open state, based on a result of detection of position detection section 80.

When latch 71 rotates from the position illustrated in FIG. 3A to the position illustrated in FIG. 3D by the driving of closure motor 75, a signal of position detection section 80 switches from the ON state described above to the OFF state described above. Given the switching of the signal of position detection section 80 from the ON state to the OFF state, mobile body 20 is controlled to move to the open state.

Next, control of the engagement operation between latch 71 and striker 72, and movement control of mobile body 20 will be described.

In the case of the transition of mobile body 20 from the open state to the closed state, control section 50 controls the engagement operation between latch 71 and striker 72. Specifically, control section 50 controls lock mechanism 70 such that latch 71 engages with striker 72. Control section 50 controls moving motor 33 such that mobile body 20 is moved to the closed state.

Note that, when mobile body 20 is in the open state, control section 50 may control closure motor 75 such that latch 71 is moved to the position of the unlatched state in a case where the position of latch 71 is on standby in a standby position other than that of the unlatched state. Control section 50 then controls moving motor 33 such that mobile body 20 is moved to the closed state.

The standby position is, for example, a position on a downstream side in the clockwise direction with respect to the position illustrated in FIG. 3D, and where recess portion 71D of latch 71 can neither receive nor engage with striker 72. The position of the unlatched state of latch 71 can be described as, for example, a position intermediate between the position of the fully-latched state and the standby position.

After mobile body 20 moves and striker 72 enters recess portion 71D of latch 71 in the unlatched state, control section 50 drives closure motor 75 to transition latch 71 from the unlatched state to the fully-latched state. Thus, mobile body 20 is locked in the closed state.

Further, in a case where latch 71 is forced to move from the unlatched state to the half-latched state due to the movement of mobile body 20, control section 50 may drive closure motor 75 based on the result of detection of position detection section 80. Specifically, striker 72 enters recess portion 71D of latch 71 to press latch 71, and thus, latch 71 transitions from the unlatched state to the half-latched state. As a result, the signal of position detection section 80 switches from the OFF state to the ON state. Thus, closure motor 75 is controlled such that latch 71 is set to the fully-latched state from the half-latched state. Note that, control section 50 may control closure motor 75 not based on the result of detection of position detection section 80, but based on a result of detection of mobile body detection section 60.

Further, during movement of latch 71 from a movement start position to a predetermined position, control section 50 controls closure motor 75 based on a driving time set in advance. Specifically, control section 50 controls closure motor 75 only for a driving time necessary for latch 71 to move from the movement start position to the predetermined position.

In a case where mobile body 20 is in the closed state, the movement start position of latch 71 is the position of the fully-latched state. In a case where mobile body 20 is in the open state, the movement start position of latch 71 may be the position of the unlatched state or the standby position described above.

In a case where the movement start position of latch 71 is the position of the fully-latched state position or the standby position, the predetermined position can be configured to be the position of the unlatched state in which latch 71 is capable of opening or receiving striker 72. Further, in a case where the movement start position of latch 71 is the position of the unlatched state, the predetermined position can be configured to be, for example, the position of the fully-latched state. Note that, the predetermined position may be an arbitrarily set position.

In addition, in case where control section 50 determines that position detection section 80 is abnormal during the movement of latch 71 from the movement start position to the predetermined position, control section 50 controls closure motor 75 such that the position of latch 71 is adjusted.

Examples of position detection section 80 being abnormal include a case where a failure of position detection section 80 can be determined due to no change in the signal of position detection section 80.

For example, in a case where position detection section 80 is normal when latch 71 moves between the position of the fully-latched state and the position of the unlatched state, the signal of position detection section 80 switches between the ON state and the OFF state. In a case where position detection section 80 fails when latch 71 moves between the position of the fully-latched state and the position of the unlatched state, however, there is no change in the signal of position detection section 80. For this reason, a failure of position detection section 80 can be even determined given no change in the signal of position detection section 80.

Further, examples of position detection section 80 being abnormal include a case where it can be determined that a voltage of closure motor 75 changes due to a temperature around mobile body moving device 1 and/or an operation environment of mobile body moving device 1 and latch 71 has not moved to the predetermined position.

For example, when the temperature around mobile body moving device 1 decreases, a voltage applied to closure motor 75 decreases. Further, in mobile body moving device 1, there is a case where the power of a battery is consumed in portions other than moving motor 33 and closure motor 75, such as operation of an air conditioner in the vehicle body. In this case, the voltage applied to closure motor 75 relatively decreases.

Thus, when the voltage applied to closure motor 75 changes, the movement quantity of latch 71 based on the driving quantity of closure motor 75 in the driving time set in advance changes. As a result, a situation arises in which latch 71 does not move to a position assumed by latch 71. Specifically, in a case where the movement quantity of latch 71 to the position of the unlatched state is insufficient when latch 71 moves from the position of the fully-latched state to the position of the unlatched state, the signal from position detection section 80 does not change as a matter of course. In such a case, it can be determined that latch 71 has not moved to the predetermined position.

Further, in a case where latch 71 passes through the position of the unlatched state and moves to the position of the half-latched state when latch 71 moves from the standby position described above to the position of the unlatched state, the signal of position detection section 80 is set to the ON state. That is, in this case, it can also be determined that latch 71 has not moved to the predetermined position.

In these cases, it is impossible to satisfy determination criteria for moving mobile body 20 since control section 50 determines, based on the result of detection of position detection section 80, that the position of latch 71 is not the position of the unlatched state.

Accordingly, in the present embodiment, in a case where control section 50 determines that position detection section 80 is abnormal, the position of latch 71 is adjusted.

Specifically, when latch 71 moves from the movement start position to a current position, control section 50 calculates a necessary driving time from a first initial voltage in closure motor 75 and a reference electrical quantity, in the movement start position.

The first initial voltage is an initial voltage applied to closure motor 75 in the movement start position when latch 71 moves from the movement start position to the current position, and is a value based on a result of detection of voltage detection section 90.

The reference electrical quantity is an electrical quantity calculated by multiplying time taken for past movement of latch 71 from the movement start position to the predetermined position by a second initial voltage in closure motor 75 in the movement start position during the movement.

Further, the past movement described above is preferably, for example, a latest movement in a past movement history of latch 71, when position detection section 80 is not abnormal. Thus, it is possible to calculate a reference electrical quantity in which deterioration over time of closure motor 75 and/or the like is taken into consideration. Further, in a case where there is no past movement history, an initial value of a reference electrical quantity set in advance may be used. Note that, the reference electrical quantity is not limited to that which involves the past movement described above, but may be the initial value described above.

Control section 50 may calculate the reference electrical quantity at a timing at which control section 50 determines that position detection section 80 is abnormal or at a timing of the past movement. Control section 50 causes the calculated reference electrical quantity to be stored in, for example, the storage section (not illustrated) or the like.

Control section 50 calculates a difference value between the reference electrical quantity and a current movement electrical quantity by multiplying the first initial voltage by a driving time of closure motor 75 during the movement of latch 71 from the movement start position to the current position. Control section 50 then calculates, based on the difference value and the first initial voltage, a necessary driving time of closure motor 75, which is necessary for movement of latch 71 from the current position to the predetermined position where latch 71 should be originally positioned.

Control section 50 then drives closure motor 75 only for the necessary driving time. Thus, latch 71 moves from the current position to the predetermined position. Specifically, in a case where the movement of latch 71 is insufficient, control section 50 drives closure motor 75 such that latch 71 moves only by the insufficient distance. Further, in a case where the movement of latch 71 is excessive, control section 50 drives closure motor 75 such that latch 71 moves back only by the distance of passage of latch 71 from the predetermined position.

In this way, even in a case where latch 71 has not moved to the predetermined position due to an abnormality of position detection section 80, it is possible to move latch 71 to the predetermined position. Accordingly, even in a case where the voltage applied to closure motor 75 changes, latch 71 of lock mechanism 70 driven by closure motor 75 can be controlled to be positioned in the predetermined position.

Further, in a case where the necessary driving time is a value near 0, it is considered that latch 71 is in a substantially predetermined position. In this case, control section 50 may determine that position detection section 80 fails. In this way, it is possible to accurately determine whether or not position detection section 80 fails. In this case, control section 50 may also output a notification command for notifying the failure of position detection section 80 to surroundings. In this way, it is possible to quickly notify a user that position detection section 80 fails.

[Driving Control of Latch in Mobile Body Moving Device]

Figure 5:
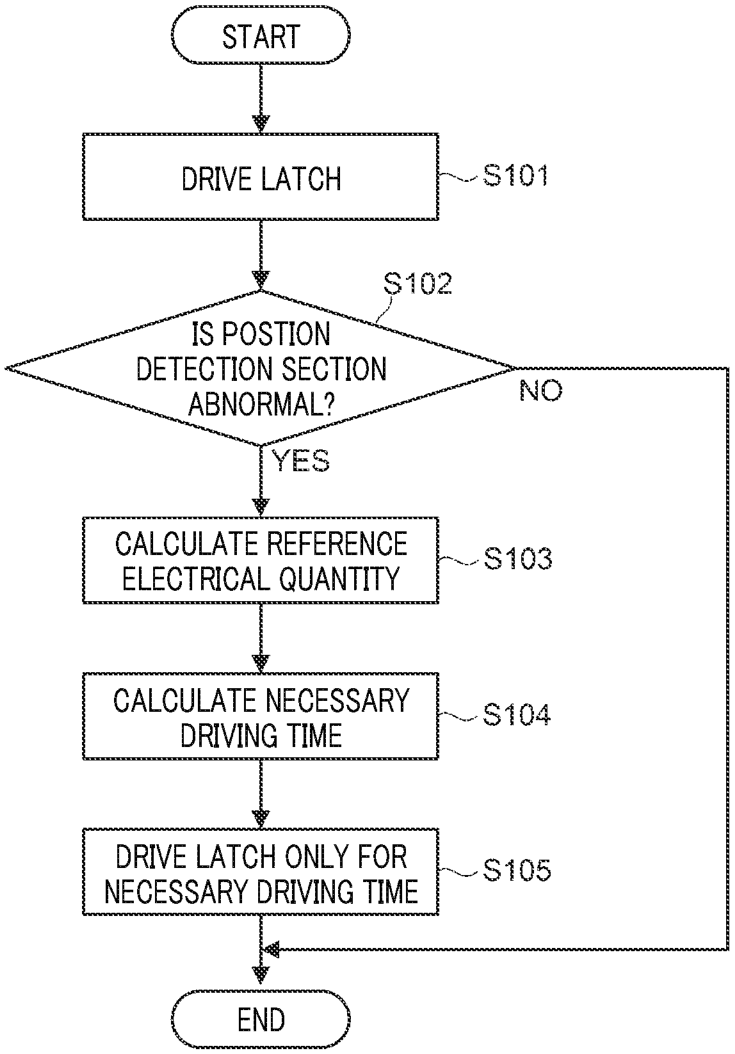
FIG. 5 is a flowchart provided for describing driving control of a latch in the mobile body moving device.

FIG. 5 is a flowchart provided for describing driving control of latch 71 in mobile body moving device 1. Note that, the control in FIG. 5 is executed when an operation instruction for moving mobile body 20 is received, for example.

As illustrated in FIG. 5, control section 50 controls closure motor 75 such that latch 71 is driven (step S101). Next, control section 50 determines whether or not position detection section 80 is abnormal (step S102).

As a result of the determination, in a case where position detection section 80 is not abnormal (step S102, NO), the control ends. In a case where position detection section 80 is abnormal (step S102, YES), on the other hand, control section 50 calculates the reference electrical quantity (step S103).

Next, control section 50 calculates the necessary driving time of closure motor 75 based on the calculated reference electrical quantity (step S104). Control section 50 then controls closure motor 75 such that latch 71 is driven only for the calculated necessary driving time (step S105). Thereafter, the control ends. Note that, after step S105, movement control of mobile body 20 and/or control of moving latch 71 to the position of the fully-latched state or the like are performed as appropriate.

According to the present embodiment configured as described above, it is possible to move latch 71 to the predetermined position even in a case where latch 71 has not moved to the predetermined position due to an abnormality of position detection section 80. That is, even in a case where the voltage applied to closure motor 75 changes, latch 71 of lock mechanism 70 driven by closure motor 75 can be controlled to be positioned in the predetermined position. As a result, it is possible to accurately perform the engagement operation and the release operation between latch 71 and striker 72.

Further, since the reference electrical quantity is calculated based on the time taken for the latest movement in the past movement history of latch 71, when position detection section 80 is not abnormal, it is possible to calculate the reference electrical quantity in which the deterioration over time of closure motor 75 is taken into consideration. As a result, it is possible to calculate an accurate necessary driving time.

Further, by calculating the necessary driving time, it is possible to accurately determine whether or not position detection section 80 fails.

Note that, in the embodiment described above, the abnormality of position detection section 80 is determined based on a change in the signal of position detection section 80 by using only the position of the unlatched state as a reference, but the present invention is not limited thereto. For example, the abnormality of position detection section 80 may also be determined based on a change in the signal of position detection section 80 by using one or more of the position of the unlatched state, the position of the half-latched state, and the position of the fully-latched state as a reference.

Further, although the control in a case where the movement start position of latch 71 is the position of fully-latched state or the standby position has been exemplified in the embodiment described above, the present invention is not limited thereto. The movement start position of latch 71 may also be the position of the unlatched state.

In this case, position detection section 80 may be capable of detecting whether or not lock mechanism 70 is in the fully-latched state. In a case where the voltage applied to closure motor 75 changes when latch 71 moves from the position of the unlatched state to the position of the fully-latched state, the locking of mobile body 20 to opening member 10 becomes loose when the movement of latch 71 to the position of the fully-latched state is insufficient.

Since latch 71 has not moved to the position of the fully-latched state, the signal of position detection section 80 does not change. Accordingly, control section 50 determines that position detection section 80 is abnormal, and calculates the necessary driving time necessary for latch 71 to move from the current position to the predetermined position. Control section 50 then drives closure motor 75 only for the necessary driving time, whereby latch 71 is moved to the predetermined position (the position of the fully-latched state). Thus, it is possible to improve the accuracy of movement of latch 71.

Further, although control section 50 controls mobile body driving section 30 and lock mechanism 70 in the embodiment described above, the present invention is not limited thereto. It is also possible to adopt a configuration in which a plurality of control sections separately control each of the mobile body driving section and the lock mechanism.

The embodiment disclosed this time is only exemplary in every aspect and should be considered non-restrictive. The scope of the present invention is indicated not by the description above but by claims, and it is intended that every change within meaning or range equivalent to the claims is included.

The embodiment of the present invention has been described thus far. Note that, the above description is only illustration of a preferred embodiment of the present invention, and the scope of the present invention is not limited thereto. That is, the descriptions of the configuration of the above-mentioned device and the shape of each portion are only exemplary, and it is obvious that various changes and additions to these examples are possible within the scope of the present invention.

INDUSTRIAL APPLICABILITY

The mobile body moving device according to the present invention is useful as a mobile body moving device capable of performing control such that an engaging portion of a lock mechanism driven by a driving section is positioned in a predetermined position even in a case where a voltage changes.

REFERENCE SIGNS LIST

1 Mobile body moving device
10 Opening member
11 Opening
20 Mobile body
30 Mobile body driving section
31 Main-body cylinder portion
32 Sliding cylinder portion
33 Moving motor
50 Control section
60 Mobile body detection section
70 Lock mechanism
71 Latch
71A Base portion
71B First arm
71C Second arm
71D Recess portion
72 Striker
73 Turning shaft

74 Pole
75 Closure motor
80 Position detection section
90 Voltage detection section

What is claimed is:

1. A mobile body moving device, comprising:

a mobile body that moves between an open position and a closed position with respect to a base;

an engaged portion provided in one of the base and the mobile body;

a lock mechanism, provided in the other of the base and the mobile body, including:

an engaging portion that engages with the engaged portion, a motor that performs an engagement operation and a release operation between the engaging portion and the engaged portion, and moves the engaging portion between a position of a fully-latched state and a position of an unlatched state, and a position detection section that detects a position of the engaging portion, the fully-latched state being a state in which the engaged portion is locked by the engaging portion, the unlatched state being a state capable of receiving the engaged portion in the engaging portion;

a control section that controls the engagement operation and the release operation by the motor; and a voltage detection section that measures a voltage of the motor, wherein the control section calculates a reference electrical quantity by multiplying time taken for movement of the engaging portion from a movement start position to at least one predetermined position by an initial voltage for the movement of the engaging portion, the at least one predetermined position being the position of the fully-latched state upon the engagement operation and being the position of the unlatched state upon the release operation, and wherein when the control section determines that the position detection section is abnormal during another movement of the engaging portion from the movement start position to the at least one predetermined position, the control section calculates a necessary driving time from the reference electrical quantity and a movement initial voltage for the movement of the engaging portion from the movement start position during the other movement, and drives the motor only for the calculated necessary driving time.

2. The mobile body moving device according to claim 1, wherein the movement of the engaging portion from the movement start position to the at least one predetermined position is a latest past movement in a past movement history of the engaging portion when the control section determines that the position detection section is not abnormal.

3. The mobile body moving device according to claim 1, wherein:

the calculated necessary driving time is a driving time necessary for the engaging portion to move from a current position to the at least one predetermined position, and wherein the current position is a position to which the engaging portion moves from the movement start position due to the movement initial voltage.

* * * * *